(12) United States Patent
Le Croix (10) Patent No.: US 8,402,925 B2
(45) Date of Patent: Mar. 26, 2013

(54) RETRACTABLE ANIMAL LEASH

(76) Inventor: Timothy G. Le Croix, Clermont, FL (US)

( * ) Notice: Subject to any disclaimer, the term of this patent is extended or adjusted under 35 U.S.C. 154(b) by 131 days.

(21) Appl. No.: 12/990,171

(22) PCT Filed: Apr. 28, 2009

(86) PCT No.: PCT/US2009/002580
§ 371 (c)(1),
(2), (4) Date: Oct. 28, 2010

(87) PCT Pub. No.: WO2009/134353
PCT Pub. Date: Nov. 5, 2009

(65) Prior Publication Data
US 2011/0041778 A1   Feb. 24, 2011

Related U.S. Application Data

(60) Provisional application No. 61/048,371, filed on Apr. 28, 2008.

(51) Int. Cl.
*A01K 27/00* (2006.01)
*B65H 75/34* (2006.01)
(52) U.S. Cl. .................................... 119/796; 242/379
(58) Field of Classification Search ............... 119/794, 119/796; 242/379, 396.2, 396.4
See application file for complete search history.

(56) References Cited

U.S. PATENT DOCUMENTS

| | | | |
|---|---|---|---|
| 2,647,703 A * | 8/1953 | Hayes | 242/381.6 |
| 2,889,807 A * | 6/1959 | Beebe | 119/794 |
| 3,853,283 A | 12/1974 | Croce et al. | |
| 4,197,817 A * | 4/1980 | Crutchfield | 119/794 |
| 4,328,767 A * | 5/1982 | Peterson | 119/794 |
| 4,748,937 A * | 6/1988 | Musetti | 119/796 |
| 4,887,551 A * | 12/1989 | Musetti | 119/796 |
| 4,964,370 A * | 10/1990 | Peterson | 119/794 |
| 5,092,537 A | 3/1992 | Eggebeen | |
| 5,120,003 A | 6/1992 | Sacconi | |
| 5,279,473 A * | 1/1994 | Rozon | 242/377 |
| 5,377,626 A | 1/1995 | Kilsby et al. | |
| 5,816,198 A * | 10/1998 | Peterson | 119/794 |
| 6,045,076 A | 4/2000 | Daniels | |
| 6,047,664 A | 4/2000 | Lyerly | |
| 6,904,872 B2 | 6/2005 | Muller | |
| 6,925,967 B1 | 8/2005 | Woodruff | |
| 6,929,209 B2 * | 8/2005 | Baumgarten | 242/377 |
| 7,040,257 B2 | 5/2006 | Waxman et al. | |
| 7,168,393 B2 | 1/2007 | Bogdahn et al. | |
| 8,151,735 B1 * | 4/2012 | McCrocklin | 119/796 |
| 2004/0089759 A1 * | 5/2004 | Genuise | 242/379 |
| 2008/0000433 A1 * | 1/2008 | DiDonato | 119/796 |
| 2011/0180017 A1 * | 7/2011 | Goldenberg | 119/796 |
| 2011/0181423 A1 * | 7/2011 | Lytle, Jr. | 340/573.3 |

* cited by examiner

Primary Examiner — Kristen C Hayes
(74) Attorney, Agent, or Firm — Wolfe, Sadler, Breen, Morasch & Colby, LLC (57) ABSTRACT

The present invention is a retractable animal leash having a housing that surrounds a spring activated spooled leash. The housing may be opened in order to gain access to the spring-activated spooled leash and replace or repair the spooled leash as desired.

14 Claims, 8 Drawing Sheets

RETRACTABLE ANIMAL LEASH

CROSS-REFERENCE TO RELATED APPLICATION

The present application claims priority to U.S. Provisional Patent Application No. 61/048,371 as filed Apr. 28, 2008.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to a leash apparatus for reeling and unreeling a strap or leash to walk animals. More particularly, the present invention relates to a leash apparatus wherein an individual may quickly and easily remove, repair, and/or replace the leash.

2. Description of the Related Art

The prior art is fraught with various types of leashes for walking animals; and a retractable leash is well known in the art.

For example, U.S. Pat. No. 7,168,393 to Bogdahn et al. (hereinafter "Bogdahn) teaches a leash assembly having a strap or leash that can be reeled or unreeled for walking animals. The assembly has a handle and a housing attached thereto in which the strap is arranged on a turn able roller device for being reeled or unreeled. The assembly also includes a brake key that can stop and prevent rotation of the roller device to restrict a part of the strap extending externally of the housing to a desired length. In addition, the assembly includes an exit opening through which the strap extends externally of the housing.

U.S. Pat. No. 7,040,257 to Waxman et al. (hereinafter "Waxman) teaches a retractable leash device comprised of a housing with a handle, and a leash wound around an internal reel. The reel is biased by a spring to automatically retract the leash. A momentary unidirectional lock in the housing is arranged to be normally disengaged from unidirectional teeth on the reel. When the momentary unidirectional lock is actuated, the reel is engaged by a ratchet to prevent rotation in the release direction but permit rotation in the retract direction. A toggle lock in the housing is movable between an unlocked position away from the reel, and a locked position between cogs on the reel. A geared rotation damper is engaged with a concentric gear on the reel to limit retraction speed. A clip attached to the housing may be clipped around the leash when the leash is wrapped around a fixed object.

There are additionally similar leash assemblies commercially available. However, each of these prior art leash assemblies suffer from a significant limitation. In particular, there are few to no means for an individual to easily and properly repair or replace the spooled leash in the event that such leash is damaged or found to be less aesthetically pleasing as another type of spooled leash. This is a significant issue regarding retractable leashes because retractable leashes are significantly more expensive than traditional animal leashes.

Thus, what is desired is a retractable leash apparatus in which an individual may easily remove, repair, and/or replace the spooled leash from the housing.

SUMMARY

The various exemplary embodiments of the present invention include a retractable animal leash apparatus. The apparatus is comprised of a housing, a spool, a leash, a central axle, at least one spring, and an opening in the housing. The housing has a handle or ergonomically designed grip as well as inner walls and exterior walls. The housing may be opened. The spool is comprised of a central cylinder open at each end and a disk-shaped wall attached to each end of the center cylinder. Each of the disk-shaped walls has a central opening substantially corresponding to the opposing open ends of the central cylinder. The leash is attached at a first end to the central cylinder. The central axle has an inner housing and an outer housing, wherein the outer housing is substantially surrounded by the central cylinder of the spool. The at least one spring is attached to the central axle such that as the spool is unreeled, the spring is wound up, and as the spring is released, the spool automatically reels the leash back into the housing. The opening in the housing allows the leash to unreel from the spool.

Another exemplary embodiment of the present invention includes a retractable animal leash apparatus of a housing, a spool, a leash, one or more rotating plates, at least one spring, and an opening in the housing. The housing has a handle or ergonomically designed grip as well as inner walls and exterior walls. The housing may be opened. The spool is comprised of a central cylinder open at each end and a disk-shaped wall attached to each end of the center cylinder. Each of the disk-shaped walls has a central opening substantially corresponding to the opposing open ends of the central cylinder. The leash is attached at a first end to the central cylinder. The at least one rotating plate is attached to a post on the inner wall. The at least one spring attached to the post on the inner wall and located between the at least one rotating plate and the inner wall of the housing such that as the spool is unreeled, the spring is wound up, and as the spring is released, the spool automatically reels the leash back into the housing. The opening in the housing allows the leash to unreel from the spool.

BRIEF DESCRIPTION OF THE DRAWINGS

The various exemplary embodiments of the present invention, which will become more apparent as the description proceeds, are described in the following detailed description in conjunction with the accompanying drawings, in which.

DESCRIPTION OF THE REFERENCED NUMERALS

10 retractable leash apparatus
20 housing
20a window
22 handle
24 inner walls
26 outer walls
28 post
30 spool
32 central cylinder
34 disk-shaped wall
40 central axle
43 inner housing of the central axle
44 outer housing of the central axle
46 at least one spring
47 first end of spring
48 second end of spring
50 leash
60 rotating plate
70 braking means
75 hinge means
80 cartridge
85 cartridge casing
90 circuit
95 power source
100 brushes
105 flat contacts
110 processor
115 electricity conducting portion of the leash

DETAILED DESCRIPTION

The drawings show, for purposes of further illustration and understanding, that the various exemplary embodiments of the present invention include a retractable leash apparatus 10.

The retractable leash apparatus is comprised of a housing 20 surrounding a spool 30.

The housing may be in any desired shape. Preferably, the housing includes a handle 22 or other ergonomically-shaped means of holding the housing by an individual.

The housing is preferably comprised of a plastic or plastic-like material. The housing has inner walls 24 and outer walls 26. The housing may be substantially transparent such that an individual may view the interior of the housing. In a preferred embodiment, the housing may include a window 20a for viewing of the interior of the housing. An individual may open the window in exemplary embodiments to gain access to the interior of the housing.

In an exemplary embodiment, the housing is comprised of at least two portions which are fit together to substantially enclose the spool. The at least two portions of the housing are fit together such that the inner wall of one portion faces the inner wall of another portion. The exterior wall of each portion face away from one another. When the at least two portions are fit together, an opening will be present to allow a leash to exit from the interior of the housing.

Figure 5:
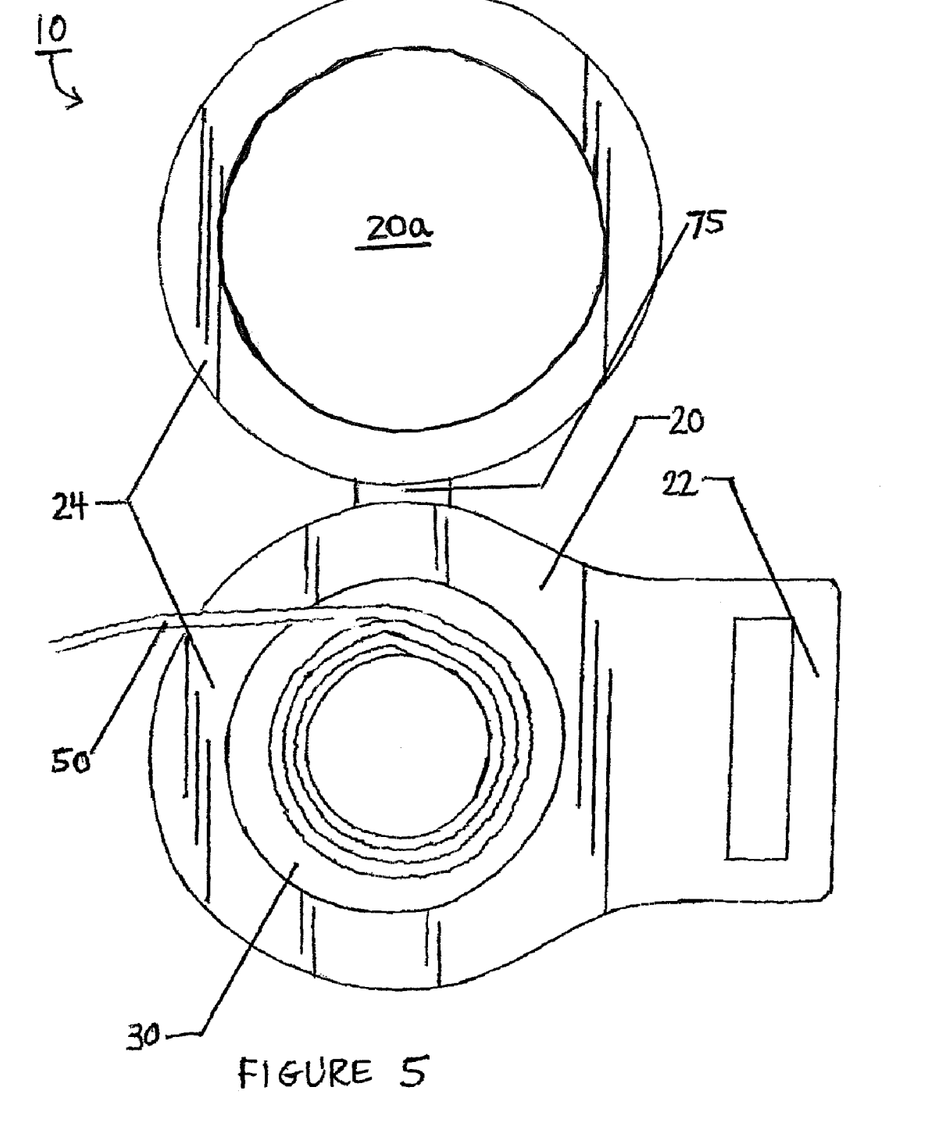
FIG. 5 is a top view of an exemplary embodiment of the present invention illustrating an open position of the housing.
Figure 6:
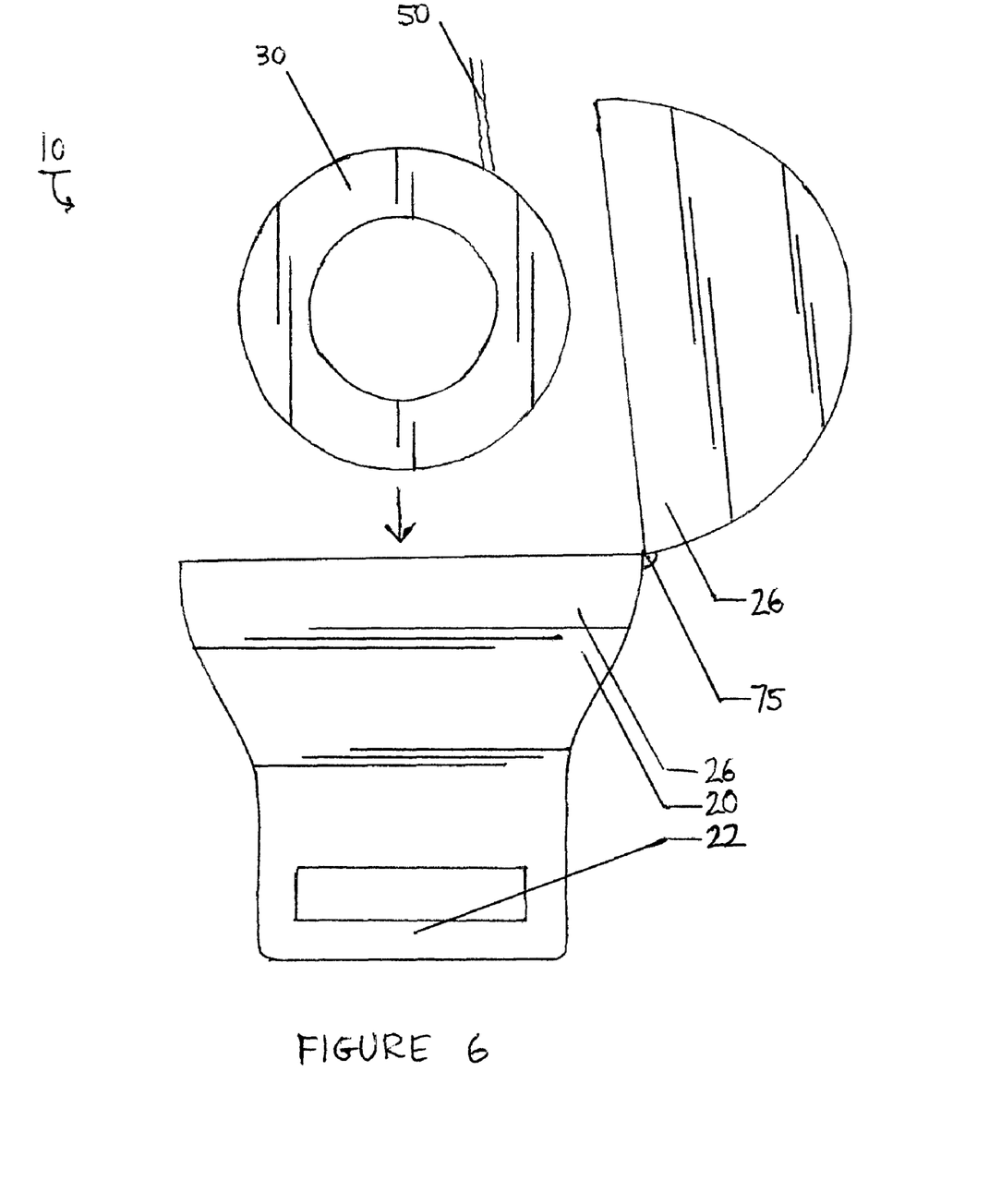
FIG. 6 is a side view of an exemplary embodiment of the present invention illustrating another open position of the housing.

When the housing is opened, the at least two portions of the housing may be substantially disconnected from one another or they may still be attached via one or more hinge means 75. See, for example, FIGS. 5 and 6.

When closed, the housing may be substantially held in a closed position by one or more latches, one or more removable screws, one or more pins, one or more hook and fastener means, and the like.

A spool 30 is substantially retained between the inner walls of the housing such that the spool may rotate about a central axle 40.

The spool is preferably comprised of a central cylinder 32 open at opposing ends. Attached to each end of the cylinder disk-shaped walls 34; each disk-shaped wall having a central opening substantially corresponding to the opposing ends of the central cylinder.

A first end of a leash 50 is preferably attached to the central cylinder of the spool. The leash is then wrapped around the central cylinder of the spool until substantially the entire leash is enclosing the central cylinder and the second end of the leash is exposed. The second end of the leash may be attached to an attaching means for connecting the leash to a collar (not shown) of an associated animal.

Figures 1A, 1B:
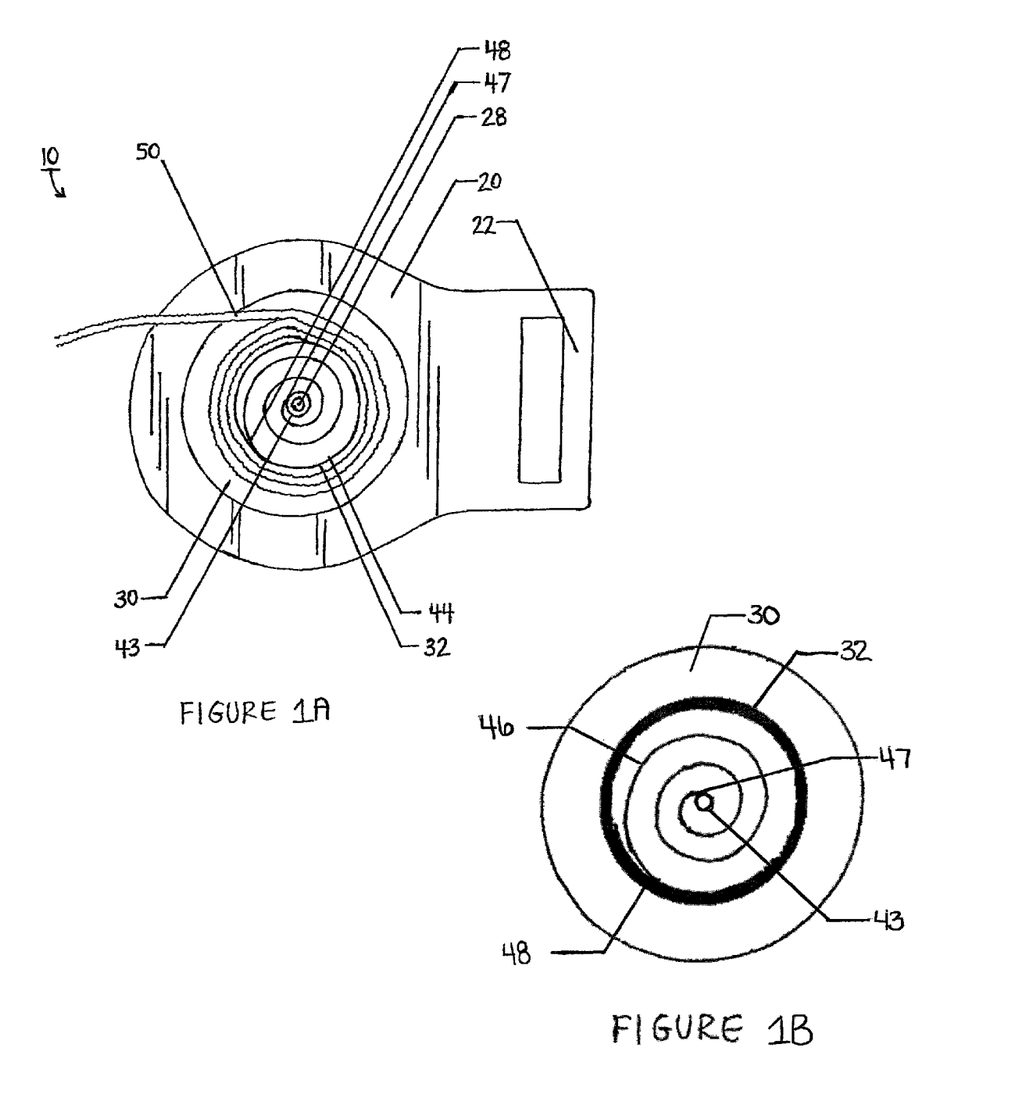
FIG. 1A is a top view of the inside of the housing of an exemplary embodiment of the present invention in which a spring is attached to an inner wall of the central axle and the spool.
FIG. 1B is a top view of a central axle and housing of an example embodiment in which a spring is attached to an inner wall of the central axle and the central cylinder of the spool.
Figure 2A:
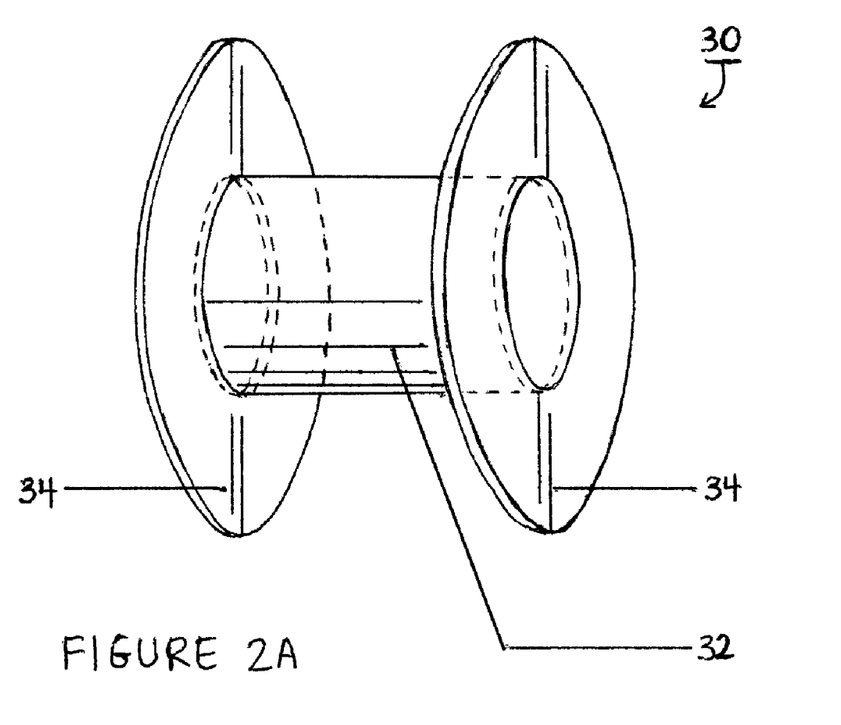
FIG. 2A is a side perspective view of a spool according to an exemplary embodiment of the present invention.
Figure 2B:
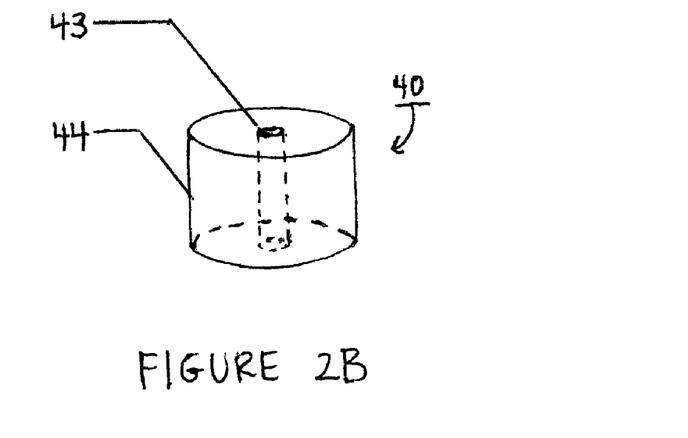
FIG. 2B is a top perspective view of a central axle according an exemplary embodiment of the present invention.

In the various exemplary embodiments of the present invention, the central axle includes at least one spring 46 substantially enclosed by a central axle outer housing 44. The central axle may be fit to substantially surround a post 28 attached to an inner wall of the housing. As illustrated in FIG. 1A, the at least one spring substantially spirals about the central axle.

In such exemplary embodiment, the central axle is snugly fit about the post attached to the inner wall of at least one portion of the housing. A first end 47 of the spring 46 is substantially attached to an inner housing 43 of the central axle. The second end 48 of the spring is substantially attached to the adjacent spool that surrounds the outer housing 44 of the central axle. See, for example, FIG. 1A and FIG. 1B in which the second end 48 of the spring is substantially attached to the central cylinder 32 of the spool 30.

In this exemplary embodiment, there may be rotation between the post and the combined spool and central axle. As the first end of the spring is substantially attached to the inner housing of the central axle and the second end of the spring is attached to the spool, rotation of the spool causes the spring to wind up. See, for example, FIG. 1.

Thus, as the leash is unreeled, that is, for an example, an animal attached to the leash is permitted to move further from an individual retaining the leash apparatus, the spring winds up as the spool rotates forward. As the animal moves closer to the individual retaining the leash apparatus, the wound up spring will cause the spool to rotate backwards thereby causing the attached leash to wrap around the central cylinder of the spool.

As the spring is attached to the spool and the central axle, removal of the spool also removes the central axle and spring; leaving only the post substantially attached to the inner wall of the housing. This allows an individual to swiftly remove the spool, central axle, and spring; and replace it with a similar spool, central axle, and spring.

Figure 7:
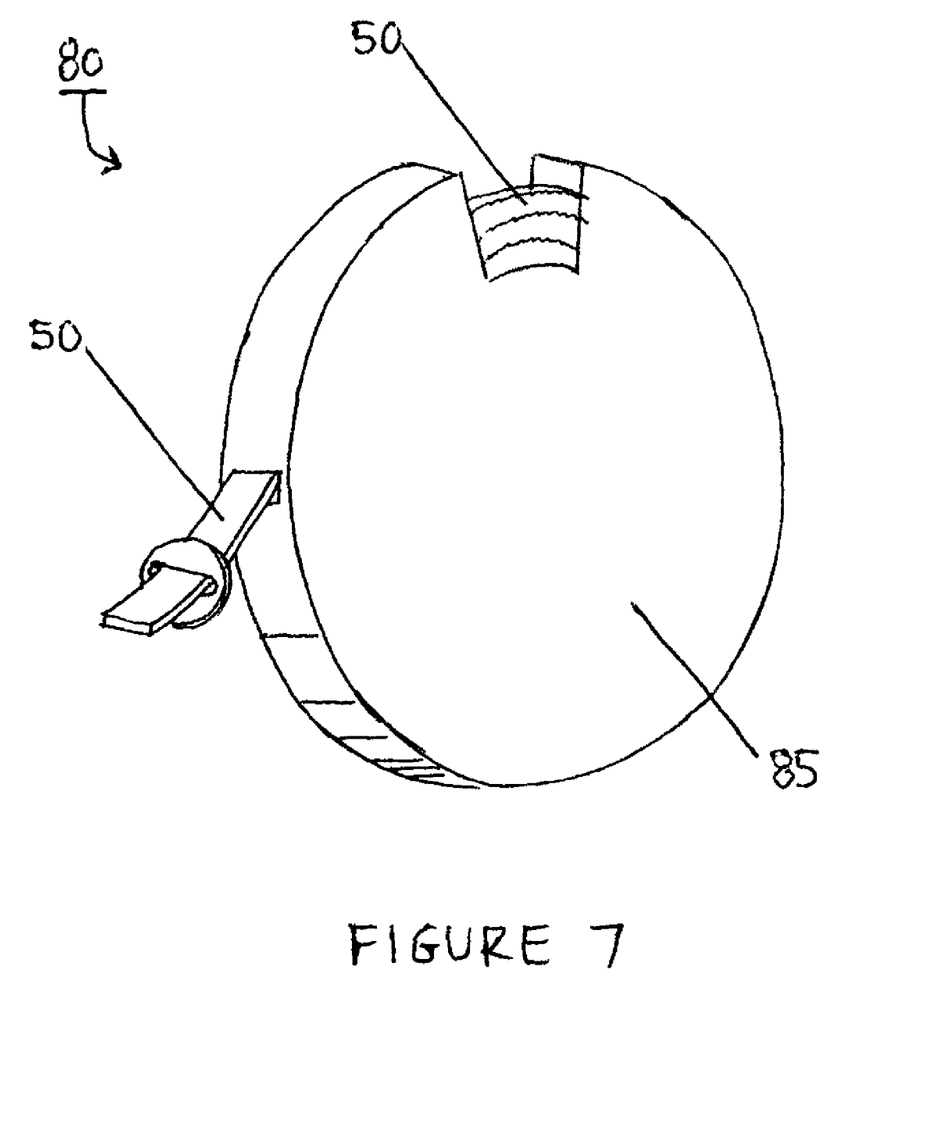
FIG. 7 is a perspective view of an exemplary embodiment of the present invention illustrating a cartridge.

In a similar exemplary embodiment, the spool, central axle, and spring are encased within a cartridge casing 85 of a cartridge 80, as illustrated in FIG. 7. In this exemplary embodiment, the cartridge is positioned within the inner wall of the housing and can swiftly and easily be removed from the housing for repair or replacement. The cartridge does not need to be held in position within the housing by the post; thus, a post is not required when a cartridge is being used.

Figure 3:
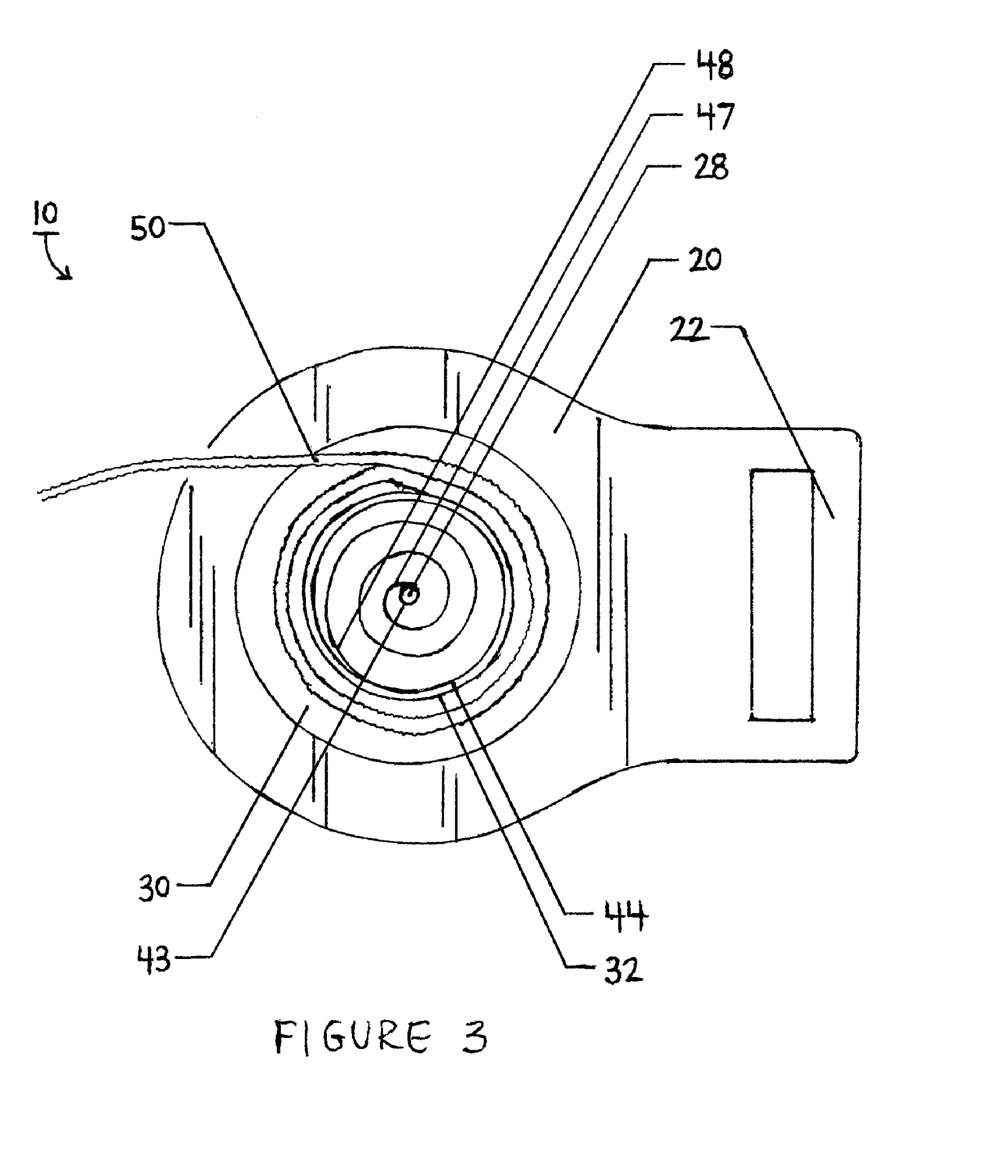
FIG. 3 is a top view of the inside of the housing of an exemplary embodiment of the present invention in which a spring is attached to an inner wall of the central axle and the outer wall of the central axle.

In another exemplary embodiment illustrated in FIG. 3, the central axle is attached to the inner wall of the housing. The first end of the spring is attached to the inner housing of the central axle. The inner housing of the central axle is preferably fixed and does not rotate. The second end of the spring is attached to the outer housing of the central axle; and the outer housing of the central axle may rotate about the inner housing of the central axle.

The spool is positioned such that the central cylinder snugly surrounds the outer housing of the central axle. As the leash is unreeled, the spool rotates and causes rotation of the outer housing of the central axle because of the friction between the spool and the outer housing of the central axle. Rotation of the outer housing of the central axle causes the spring to wind up.

As the spring is attached to the inner housing of the central axle and to the outer housing of the central axle, removal of the spool does not remove the central axle and spring. In this exemplary embodiment, an individual needs only remove the spool and associated leash and not the central axle and spring.

Figure 4:
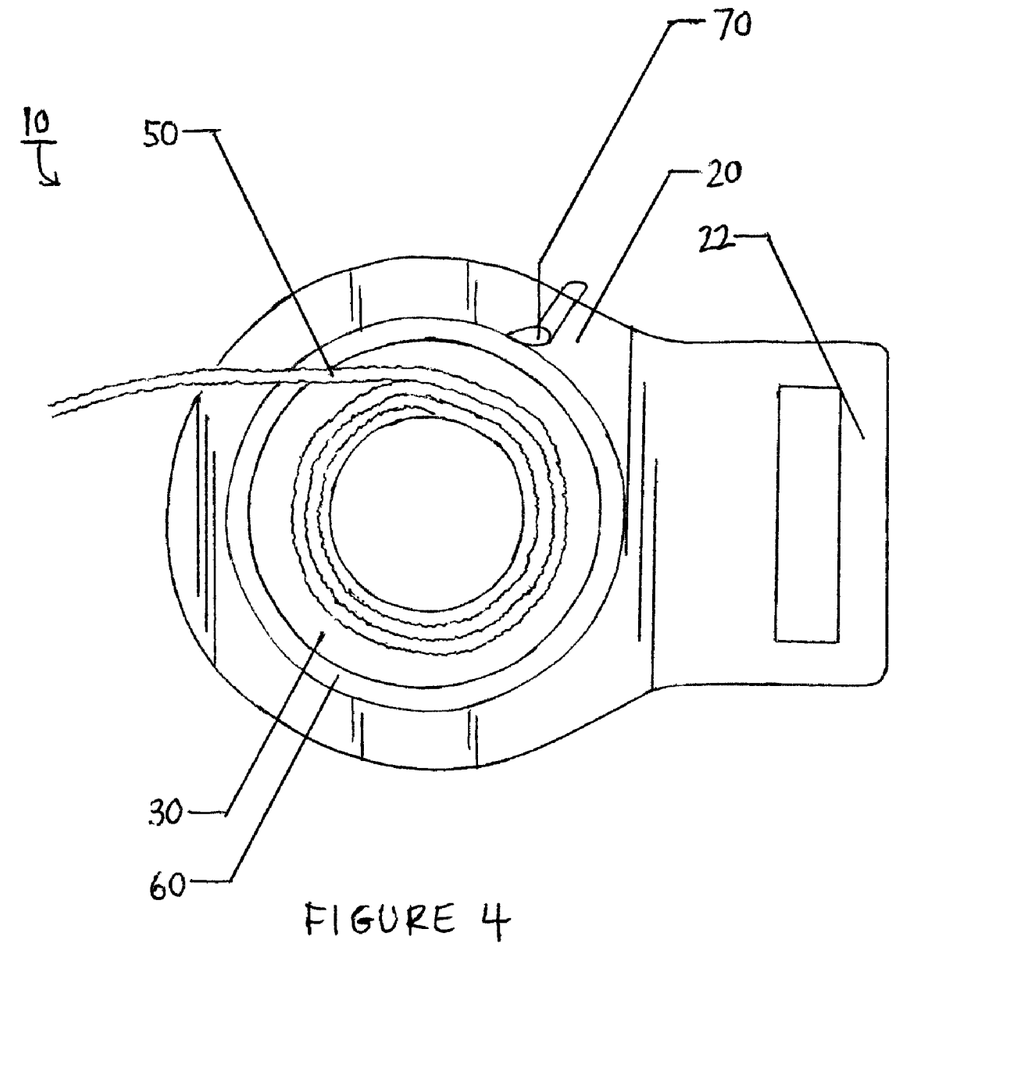
FIG. 4 is a top view of the inside of the housing of an exemplary embodiment of the present invention in which a spool is adjacent to a rotating plate.

In yet another exemplary embodiment exemplified in FIG. 4, the inner walls of the housing each include a rotating plate 60. A spring may be located between at least one of the rotating plates and the inner wall of the housing. A first end of such spring may be attached to a post located substantially at the center of the rotating plate. The second end of such spring may be attached to the rotating plate.

In this exemplary embodiment, the spool and wound leash may be positioned between the two rotating plates within the housing. There is friction between the disk shaped walls and the rotating plates such that as the leash is unwound, the spring associated with the rotating plates is wound up.

Removal of the spool and wound leash in this exemplary embodiment does not require removal of the spring or rotating plates.

In various exemplary embodiments, the retractable leash apparatus may further include a braking means 70.

The braking means may be in the form of a block tangential to at least one of the disk-shaped walls of the spool. A force may be applied to the block such that the block hinders and eventually stops the rotation of the spool.

In another embodiment, the disk-shaped walls of the spool include ratcheted teeth. As a force is applied to the braking means, the tangential block is moved closer to the spool and the ratcheted teeth until the tangential block and ratcheted teeth stop the rotation of the spool.

Figure 8:
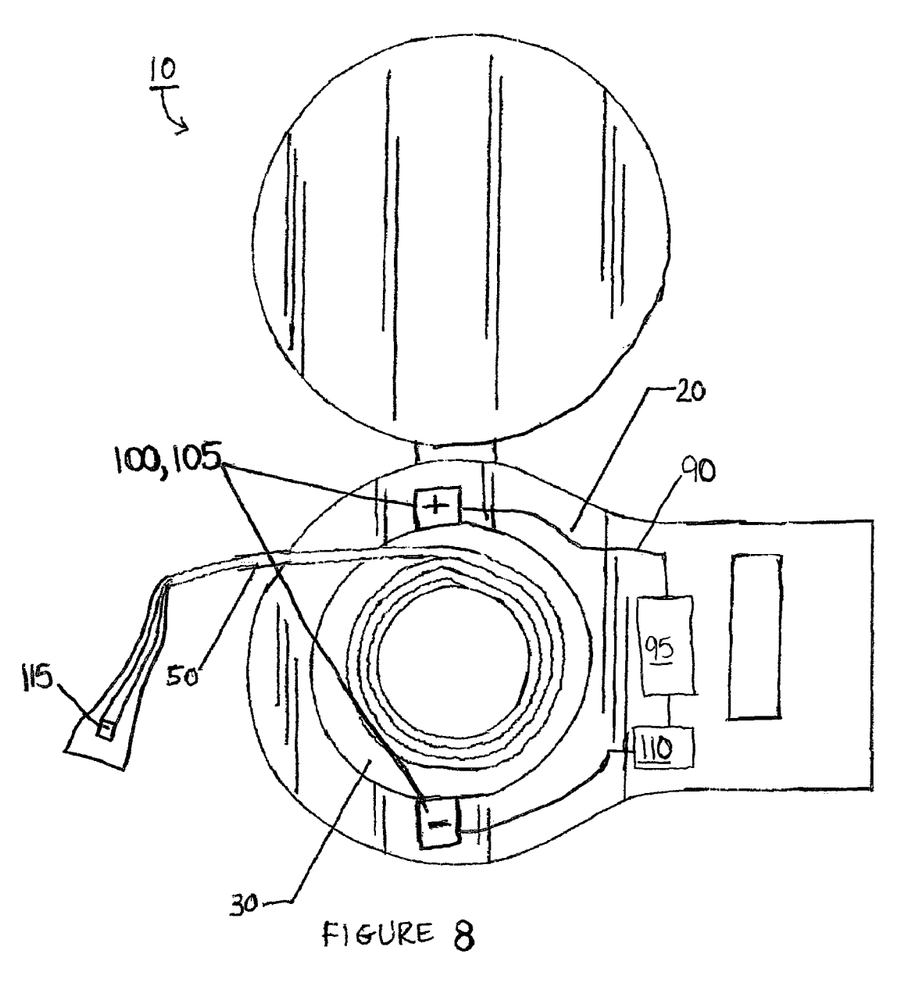
FIG. 8 is a top view of an example embodiment including a circuit connected to a power source.

In various exemplary embodiments, a circuit 90 connected to a power source 95 may be present within the housing. The circuit 90 may be connected to a button on the exterior of the housing which in turn turns the circuit on or off. In exemplary embodiments, the power source 95 is enclosed within the handle and/or the spool.

The circuit 90 is preferably attached to one or more brushes 100 and/or substantially flat contacts 105. The one or more brushes 100 and/or substantially flat contacts 105 substantially touch metallic surfaces on the spool (not shown). As the circuit 90 is turned on, electricity can be transferred from the one or more brushes 100 and/or substantially flat contacts 105 to the spool which then connects to one or more electricity conducting portions of the leash 115 such as, for example, wires running part or a substantial length of the leash.

Supplying electricity to the leash in this manner allows for the leash to light up via one or more electroluminescent tape lights, LEDs, and the like. In another embodiment, the second end of the leash may include a means for supplying a mild electric shock or other behavior deterrent, such as, for example, a prerecorded sound to be played, to an animal on the leash in order to correct behavior of the animal. The prerecorded sound could be played via one or more speakers (not shown) in the housing.

In another exemplary embodiment, the circuit may be connected to a processor for determining the number of rotations of the spool and therein determining the length of the leash let out. A predetermined leash length may be programmed such that when the programmed length of leash is let out, the braking means automatically stops rotation of the spool. Further, the processor may be connected to an memory means for storing and playing audio files such as, for example, voices, clicks, and the like as a teaching or behavior modifier/deterrent.

In exemplary embodiments, a USB or other digital connector may be connected with the processor.

In various exemplary embodiments, the housing may be connected to a removable wrist strap.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A retractable animal leash apparatus, the apparatus being comprised of:
    a housing having a handle or ergonomically designed grip, the housing having inner walls and exterior walls and able to be opened;
    a spool comprised of a central cylinder open at each end and a disk-shaped wall attached to each end of the center cylinder, wherein each of the disk-shaped walls has a central opening substantially corresponding to the opposing open ends of the central cylinder;
    a leash attached at a first end to the central cylinder;
    a central axle having an inner housing and an outer housing, wherein the outer housing is substantially surrounded by the central cylinder of the spool;
    at least one spring having a first end and a second end, wherein the first end of the spring is substantially attached to the inner housing of the central axle and the second end of the spring is substantially attached to the spool, the spring being configured such that as the spool is unreeled, the spring is wound up, and as the spring is released, the spool automatically reels the leash back into the housing; and
    an opening in the housing to allow the leash to unreel from the spool.

2. The retractable animal leash apparatus according to claim 1, wherein there is a post attached to the inner wall of the housing and around which the inner housing of the central axle surrounds.

3. The retractable animal leash apparatus according to claim 1, wherein the spool, leash, central axle, and at least one spring are encased in a cartridge that may be positioned within the housing.

4. The retractable animal leash apparatus according to claim 1, wherein the central axle is attached to the inner wall of the housing.

5. The retractable animal leash apparatus according to claim 1, wherein a first end of the spring is attached to the inner housing of the central axle, and the second end of the spring is attached to the outer housing of the central axle.

6. The retractable animal leash apparatus according to claim 1, further comprising a circuit and power source in the housing that connect to one or more brushes or flat contacts adjacent to the spool that transfer electricity to the spool.

7. The retractable animal leash apparatus according to claim 6, further comprising a processor for determining the number of rotations of the spool and therein determining the length of leash let out, playing audio files, providing a behavior deterrent, or a combination thereof.

8. The retractable animal leash apparatus according to claim 1, further comprising a window in the housing.

9. The retractable animal leash apparatus according to claim 1, wherein the leash is comprised of one or more electricity conducting portions.

10. The retractable animal leash apparatus according to claim 1, wherein one or more of the leash and spool are removable from the housing for repair or replacement.

11. The retractable animal leash apparatus according to claim 1, further comprising a braking means for substantially limiting the amount of leash being unspooled.

12. A retractable animal leash apparatus, the apparatus being comprised of:
   a housing having a handle or ergonomically designed grip, the housing having inner walls and exterior walls and able to be opened;
   a spool comprised of a central cylinder open at each end and a disk-shaped wall attached to each end of the center cylinder, wherein each of the disk-shaped walls has a central opening substantially corresponding to the opposing open ends of the central cylinder;
   a leash attached at a first end to the central cylinder;
   a central axle having an inner housing and an outer housing, wherein the outer housing is substantially surrounded by the central cylinder of the spool;
   at least one rotating plate attached to a post on the inner wall;
   at least one spring having a first end and a second end, wherein the first end is attached to the post on the inner wall and the second end is attached to the at least one rotating plate, wherein the spring is located between the at least one rotating plate and the inner wall of the housing such that as the spool is unreeled, the spring is wound up, and as the spring is released, the spool automatically reels the leash back into the housing;
   an opening in the housing to allow the leash to unreel from the spool; and
   a circuit and power source in the housing that connect to one or more brushes or flat contacts adjacent to the spool that transfer electricity to the spool.

13. The retractable animal leash apparatus according to claim 12, further comprising a processor for determining the number of rotations of the spool and therein determining the length of leash let out, playing audio files, providing a behavior deterrent, or a combination thereof.

14. The retractable animal leash apparatus according to claim 12, wherein the leash is comprised of one or more electricity conducting portions.

* * * * *